United States Patent
Lu et al.

(10) Patent No.: US 7,958,732 B2
(45) Date of Patent: Jun. 14, 2011

(54) INTERNAL DETONATION RECIPROCATING ENGINE

(75) Inventors: Frank K. Lu, Arlington, TX (US);
Philip K. Panicker, Arlington, TX (US);
Donald R. Wilson, Arlington, TX (US);
Jiun-Ming Li, Madou Township, Tainan County (TW)

(73) Assignee: Board of Regents, The University of Texas System, Austin, TX (US)

( * ) Notice: Subject to any disclaimer, the term of this patent is extended or adjusted under 35 U.S.C. 154(b) by 0 days.

(21) Appl. No.: 12/553,098

(22) Filed: Sep. 3, 2009

(65) Prior Publication Data

US 2009/0320812 A1 Dec. 31, 2009

Related U.S. Application Data

(63) Continuation of application No. 11/941,741, filed on Nov. 16, 2007, now abandoned.

(51) Int. Cl.
*F01B 21/04* (2006.01)
(52) U.S. Cl. .......................................... 60/698; 123/65 P
(58) Field of Classification Search .................... 60/698, 60/776, 39.38, 247; 123/65 PE, 65 VD, 65 A, 123/65 P, 65 EM
See application file for complete search history.

(56) References Cited

U.S. PATENT DOCUMENTS

| | | | | |
|---|---|---|---|---|
| 5,901,550 A * | 5/1999 | Bussing et al. | ............... | 60/39.38 |
| 6,978,616 B1 * | 12/2005 | Schauer | ............................ | 60/698 |
| 7,614,211 B2 * | 11/2009 | Chapin et al. | ................... | 60/247 |
| 2005/0144959 A1 * | 7/2005 | Lu et al. | ........................... | 60/776 |
| 2007/0144179 A1 * | 6/2007 | Pinard et al. | ..................... | 60/776 |
| 2009/0064661 A1 * | 3/2009 | Younsi et al. | .................... | 60/247 |
| 2009/0126343 A1 * | 5/2009 | Lu et al. | ........................... | 60/247 |
| 2009/0320446 A1 * | 12/2009 | Gutmark et al. | ................ | 60/247 |

* cited by examiner

*Primary Examiner* — M. McMahon
(74) *Attorney, Agent, or Firm* — Chowdhury & Georgakis, PC

(57) ABSTRACT

A method of rotating a crank shaft and in internal detonation engine are provided. The internal detonation engine comprises a deflagration to detonation transition section. The deflagration to detonation transition section is connected to a main cylinder, which houses a piston. Inducing a detonation wave from the deflagration wave and passing the detonation wave through a fluid, gives rise to high pressure and temperature in a cylinder and pushes a piston towards bottom dead center. An internal detonation reciprocating engine may be a single cylinder and may be either a two or four stroke engine. A two-stroke internal detonation reciprocating engine is similar to a four-stroke internal detonation reciprocating engine but has different valve placements. Detonations produce a more thorough combustion of the fuel and may, thereby, yield reduced emissions of carbon monoxide as compared to internal combustion engines.

16 Claims, 7 Drawing Sheets

INTERNAL DETONATION RECIPROCATING ENGINE

CROSS-REFERENCE TO RELATED APPLICATIONS

This is a continuation of application Ser. No. 11/941,741 filed Nov. 16, 2007, abandoned on Nov. 5, 2010.

FIELD OF THE INVENTION

The present invention relates generally to the field of reciprocating internal combustion engines. More particularly, the present invention relates to internal detonation reciprocating engines.

BACKGROUND OF THE INVENTION

A reciprocating engine, a piston engine, converts heat to mechanical energy. One or more pistons convert pressure into a rotating motion. A fuel-air mixture is introduced and ignited inside a cylinder, which houses a piston. Upon ignition, the hot gases expand, pushing the piston to the bottom of the cylinder. Piston recovery, return to the top of a cylinder, is achieved via either a flywheel or from the movement of additional pistons connected to a same shaft. The expanded gases are removed from the cylinder, exhausted by this stroke. The linear piston motion is converted to rotating motion via a connecting rod and a crankshaft. Increasing the number of combined pistons on a shaft yields a greater piston displacement volume and in turn a greater amount of power output.

The internal combustion reciprocating engine is widely used in almost every facet of the economy. Internal combustion reciprocating engines are used, for example, in automobiles, power generators, pumps, and power tools.

In some designs the piston may be powered in both directions in the cylinder, known as double acting.

Gasoline powered internal combustion reciprocating engines typically have efficiencies ranging from 20 to 25 percent, although theoretically internal combustion reciprocating engines can attain efficiencies up to 55%. Diesel engines, making use of higher compression ratios, yield higher efficiencies than internal combustion reciprocating engines but still do not approach 55 percent. Improvements in efficiency are always desirable for many significant reasons, which include economic gains, fuel conservation gains, and emission reductions per unit of fuel.

SUMMARY OF THE INVENTION

Aspects of the present invention provide a method and engine which give internal detonation reciprocating engines the desired improvements to a conventional internal combustion engine discussed above.

It is well known that detonation is a more efficient form of combustion than the slow speed deflagration process that is employed in internal combustion engines. Detonation releases more energy than deflagration and causes the burnt products to have higher temperatures, pressures, and densities. In turn, more work may be derived from these products. Further, pulsed detonation combustion generates less entropy than an equivalent deflagration process.

One aspect of the present invention is to obtain more useful energy from a given amount of fuel resource.

Another aspect of the present invention is to provide a detonation to power the power stroke of a conventional reciprocating engine.

Another aspect of the present invention is a flexible configuration, that is the present invention is adaptable to engines with vary numbers of cylinders, configurations, and stroke types.

Another aspect of the present invention is to accommodate multiple fuel types.

Another aspect of the present invention is to produce higher pressure ratios than those occurring in a conventional internal combustion reciprocating engine.

Another aspect of the present invention is to produce increased useful work from the higher pressure ratios achieved, in accordance with embodiments of the present invention.

An internal detonation reciprocating engine, according to the present invention, increases the efficiency of conventional internal combustion reciprocating engines.

Several suitable applications result from methods and devices described herein. Those skilled in the art will further appreciate the above-noted features and advantages of the invention together with other important aspects thereof upon reading the detailed description that follows in conjunction with the drawings.

BRIEF DESCRIPTION OF THE FIGURES

For more complete understanding of the features and advantages of the present invention, reference is now made to the detailed description of the invention along with the accompanying figures, wherein.

DETAILED DESCRIPTION OF THE INVENTION

Figure 1:
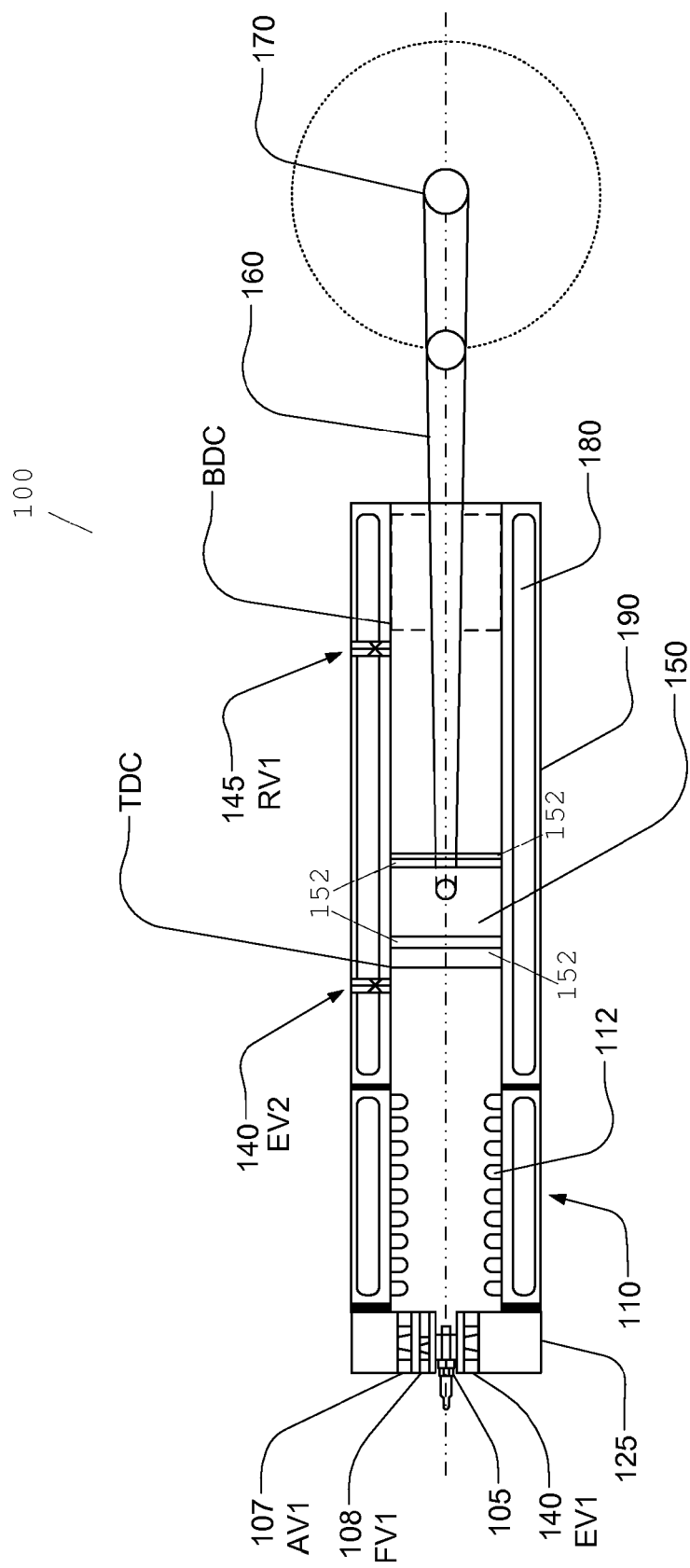
FIG. 1 shows a cross section of an embodiment of an internal detonation reciprocating engine in accordance with the present invention.

The invention, as defined by the claims, may be better understood by reference to the following detailed description. The description is meant to be read with reference to the figures contained herein. This detailed description relates to examples of the claimed subject matter for illustrative purposes, and is in no way meant to limit the scope of the invention. The specific aspects and embodiments discussed herein are merely illustrative of ways to make and use the invention, and do not limit the scope of the invention.

In conventional internal combustion reciprocating engines, detonations, or knocking is not desired and measures are taken to eliminate or reduce knocking. The octane number of gasoline is an indicator of detonability, the higher the octane number the lower the detonability. One effect of gasoline additives is a change in octane level. Gasoline additives may increase the price of fuel, add to pollution, and produce harmful products, including carcinogens. Reduction of gasoline additive usage is desirable and commensurate with aspects of the present invention.

Gasoline powered internal combustion reciprocating engines are not typically run at stoichiometric conditions, in part, because the heat released during a stoichiometric combustion is very high. This high heat can lead to engine damage or if complete fuel burning does not take place in a deflagration process, then detonation and knocking can occur.

At high engine speeds, the time available for full combustion may be too short to permit full combustion. In turn, carbon monoxide is produced and the energy release is much lower. A catalytic converter then converts carbon monoxide to carbon dioxide. Fuel rich combustion yields lower temperatures, and many internal combustion reciprocating engines are designed to run or run longer under such conditions. For reasons including those discussed above, internal combustion reciprocating engines are inherently inefficient Deflagration is the slow combustion process that occurs in conventional internal combustion reciprocating engines and gas turbine engines. Detonation is a supersonic combustion process that is more efficient than deflagration. The energy released from detonations is much higher than that produced from deflagration.

Detonation may be initiated by a high power arc, which may be impractical for engine application. A low energy spark can be used to initiate detonation if the detonation tube is long enough. Alternatively, a low energy spark can be used to initiate deflagration which can then be accelerated to detonation with induced turbulence, or deflagration to detonation transition. Turbulence inducing means include helical ridges, grooves, and spiral devices or Shchelkin spirals.

The cell size of a fuel-air mixture is widely accepted as a measure of its detonability, critical initiation energy, critical diameter of the detonation tube, and other parameters as well. The cell size is the width of diamond shaped patterns left behind by the detonation waves within tubes. Cell size is typically denoted by $\lambda$. Cell size varies with temperature, pressure, and fuel-oxidizer ratio. Examples of cell sizes fuel-air mixtures at stoichiometric conditions are provided in Table 1, below.

TABLE 1

| Fuel | Cell width (mm) | Pressure (Atm) | Temperature (° C.) | Reference |
|---|---|---|---|---|
| Hydrogen | 10.9 | 1 | 22 | Austin and Shepherd (2003) |
| Methane | 280 | 1 | 22 | Moen et al. (1984) |
| Acetylene | 9 | 1 | 22 | Knystautas et al. (1982) |
| Ethylene | 22.8 | 1 | 22 | Austin and Shepherd (2003) |
| Propane | 51.3 | 1 | 22 | Austin and Shepherd (2003) |
| Benzene | 126 | 1 | 100 | Stamps et al. (2006) |
| Hexane | 51.1 | 1 | 22 | Austin and Shepherd (2003) |
| Octane | 42 | 1 | 100 | Tieszen et al. (1991) |
| JP-10 | 60.4 | 1 | 100 | Austin and Shepherd (2003) |
| JP-10 | 47 | 1 | 135 | Akbar et al. (2000) |
| JP-10 | 54.7 | 2 | 100 | Ciccarelli and Card (2006) |
| Decane | 42 | 1 | 100 | Tieszen et al. (1991) |
| Jet-A | 45 | 1 | 135 | Akbar et al. (2000) |
| JP-4 | 45 | 1 | 100 | Tieszen et al. (1991) |

Citations to the References of Table 1 are as follows: Akbar et al., 2000, "Detonation Properties of Unsensitized JP10 and Jet-A Fuels in Air for Pulse Detonation Engines," AIAA Paper 2000-3592; Austin et al., 2003, Combustion and Flame, Vol. 132, pp. 73-90; Bull et al., 1982, Combustion and Flame, Vol. 45, pp. 7-22; Ciccarelli et al., 2006, AIAA Journal, Vol. 44, No. 2, pp. 362-367; Kaneshige et al., "Detonation Database, 1999," Explosion Dynamics Laboratory Report FM97-8, GALCIT; Moen et al., 1984, Progress in Astronautics and Aeronautics, Vol. 94, pp. 55-79; Stamps et al., 2006, Combustion and Flame, Vol. 144, pp. 289-298; and Tieszen et al., 1991, Combustion and Flame, Vol. 84, pp. 376-390.

A detonation tube diameter which is greater than or equal to a cell size will permit a natural detonation. Cell sizes can be decreased, for a given fuel-oxidizer mixture, by increasing one or both of initial temperature and pressure. Under the high pressure and temperature of a compression stoke in and engine, the cell size may be considerably smaller than those of stoichiometric conditions, such as the cell sizes provided above in Table 1.

Detonation produces higher pressure ratios than that achieved by the compression of gasoline and diesel engines. In turn, a pre-compressed fuel-air mixture in an internal detonation reciprocating engine may deliver significantly higher pressures post-detonation than that achieved by internal combustion, and the same can be used to produce more useful work. Table 2 shows exemplary detonation pressures of fuel-air mixtures at stoichiometric conditions for popular fuels.

TABLE 2

| | Fuel-air mixture | | | |
|---|---|---|---|---|
| | hydrogen | propane | Methane | gasoline |
| CJ Detonation P (atm) | 15.6 | 18.4 | 17.2 | 18 |

FIG. 1 shows a cross section of an embodiment of an internal detonation reciprocating engine 100 in accordance with the present invention. The main cylinder 190 is a long tubular section, where desired detonation occurs. The main cylinder 190 also holds electronically controlled valves 140 for removing burnt gases. The deflagration to detonation transition section 110 is a cylindrical tube with a turbulence inducing surface or structure. Internal helical grooves 112 that enable the formation of detonations are shown in the embodiment of FIG. 1.

The engine head 125 houses valves 140, 107, and 108 for supplying air and fuel as well as exhausting the burnt gases.

The piston 150 traverses the main cylinder 190 converting the kinetic energy of the gases into useful work. The piston has several rings 152 to prevent leaking of hot gases and the contamination of the oil with burnt gases. A connecting rod 160 transfers the force on the piston to the crankshaft 170. The crankshaft 170 transforms the linear motion of the piston 150 into torque and transmits the power.

The low energy ignition spark plug 105 may be similar to that of conventional gasoline internal combustion reciprocating engine systems while being resilient to the pressure and temperatures associated with detonations. The valving may be mechanically or electrically controlled to enable the appropriate supply of air and fuel and the removal of burnt gases. The relief valves 145 protect the engine in the event of high pressure build up at the wrong stage in the engine cycle. Exhaust valves 140 may also be operated for relief.

In accordance with an exemplary embodiment of the present invention, an active cooling system may not only circulate water through the cylinder casing, but may also include a heat exchanger, not shown to harness detonation energy in the form of heat. The exhaust flow may be used in a co-generation system, combined in a heat and power system.

In accordance with an embodiments of the present invention, and as shown in FIG. 1, the engine's main cylinder houses a piston and provides the structure onto which the detonation to deflagration transition section is mounted. The deflagration to detonation transition section 110 can be bolted onto the main cylinder 190 using suitable gaskets. Thus, in accordance with the embodiment of FIG. 1, parts of the engine may be easily dismantled for access, inspection, or maintenance.

A spark plug 105, in accordance with the present invention, may be similar to that used in conventional internal combustion reciprocating engines with the spark being generated by an ignition coil and driver unit. The engine head's 125 spark plug socket is made such that the spark plug 105 is recessed. The recessing protects the spark plug from direct shockwaves that may damage it. At the time of ignition, the engine cavity may be charged with a high pressure mixture of fuel and air, with a mean velocity of flow in the engine being zero. Thus, even a recessed low energy spark is enough to initiate ignition.

Figure 2:
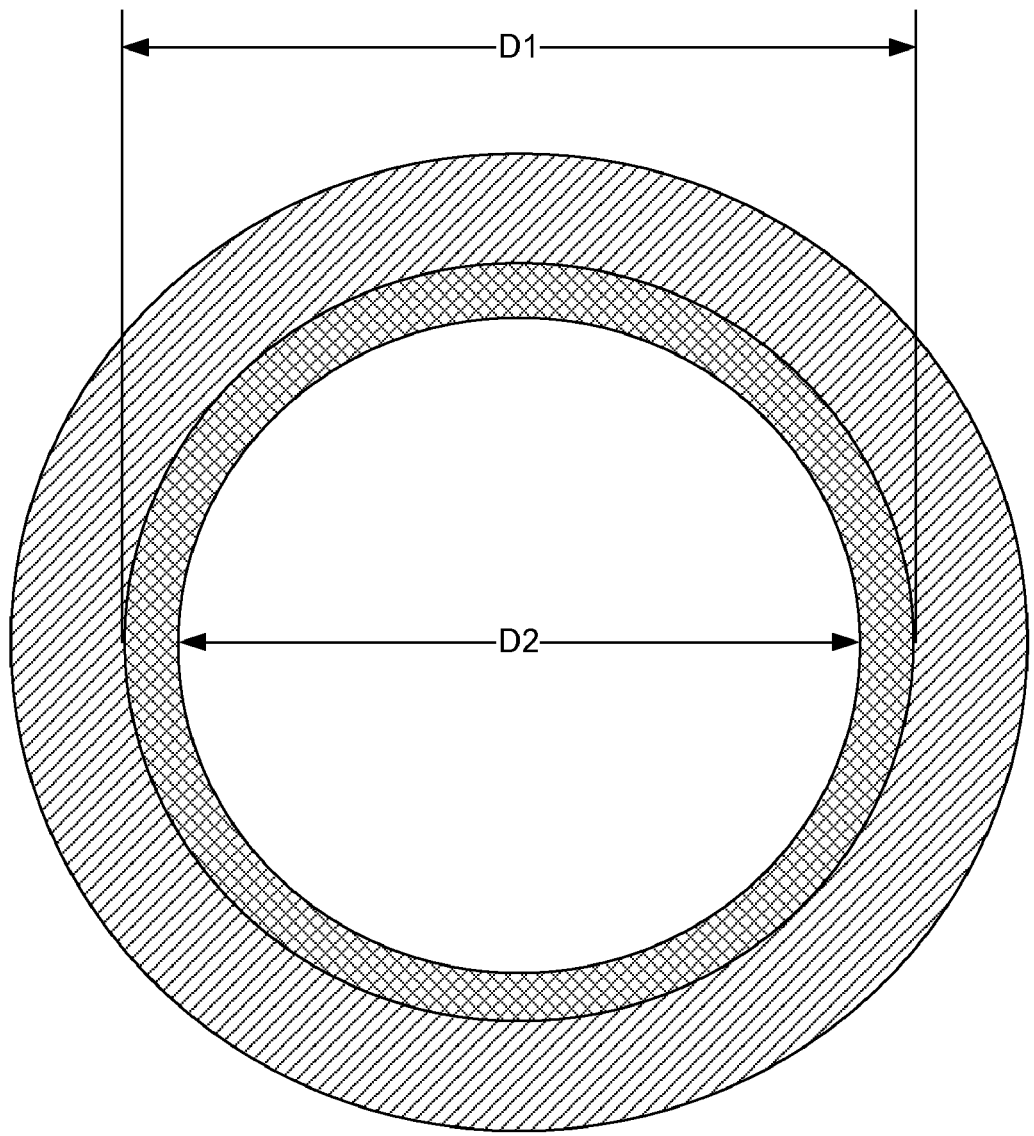
FIG. 2 shows an axial cross section of a deflagration to detonation transition section in accordance with the present invention.

The deflagration to detonation transition section 110 has a circular cross section with ridges grooved into the internal wall of the section in a helical fashion. FIG. 2 shows an axial cross section of a deflagration to detonation transition section 110 in accordance with the present invention. The deflagration to detonation transition section has the same internal diameter D1 as the main cylinder. The blockage ratio (BR) is defined as the projected area of the spiral ridge to the total internal area of cross-section of the main cylinder. D1 is the internal diameter as measured between the height of the ridges in a cross section view, as shown in FIG. 2. Equation 1, below, provides the calculation of the blockage ratio, BR.

$$BR = (D1^2 - D2^2)/D1^2 \quad (1).$$

Spirals may be designed such that their pitch is greater than or equal to one cell size and the blockage ratio is close to 50%. Large blockage ratios, in the region of 50%, can reduce the deflagration to detonation transition run-up distance.

The length of the deflagration to detonation transition section 110 may be equal to the deflagration to detonation transition run-up distance. This length may be determined using a specific set of parameters, high initial pressures and initial temperatures of the fuel-air mixture. In general, as initial pressure and temperature increase, the deflagration to detonation transition run-up distance tends to decrease dramatically. Thus, the deflagration to detonation transition section may be in the range of about 20 to 30 cm, while the main cylinder may be in the range of 30 to 50 cm in length. The shorter the combined length of the deflagration to detonation transition section and main cylinder, the smaller the fuel requirements per engine cycle.

The stroke length of an internal detonation reciprocating engine may be as much as much as 2 to 5 times the stroke length of a diesel engine. However, at the top dead center position, a piston, in accordance with the present invention is still within the main cylinder. The length of the free volume within the engine cavity when the piston is at top dead center may be slightly longer than the deflagration to detonation transition run-up distance of the fuel-air mixture.

The long stroke of the internal detonation reciprocating engine also makes the engine slower compared to the diesel or gasoline engines. However, the torque can be stepped down via gears to provide desired higher speeds at the wheels of the vehicle.

The engine head 125 houses the spark plug 105 and several valves, for example 107, 108, and 140 in FIG. 1. In accordance with the present invention, the engine head 125 houses at least one air valve. In some embodiments, there may more than one valve to supply air AV1 107. There may also be one or more fuel valves, FV1, 108 in some embodiments of the present invention. In addition, there may be one or more exhaust valves, 140 in FIG. 1, housed in the engine head 125. The valves, in accordance with present invention, may be electrical or mechanically driven. Electric valves may enable control via a centralized digital control system.

On the main cylinder 190, there is one exhaust valve, labeled EV2 in FIG. 1 140, and a pressure relief valve, labeled RV1 145 in FIG. 1. These valves may also be mechanically or electrically driven.

Air valves, AV1 in FIG. 1, for example, fill the engine cavity with air for purging the burnt products and also for charging with a fresh mixture. Fuel valves FV1 may be smaller in size or number as compared with air valves, since the amount of fuel volume required is much lower. Exhaust valves EV1 and EV2 allow the burnt products to be exhausted from the engine cavity.

Fuel-air mixtures have detonability limits, or, minimum and maximum fuel percentages of fuel air mixtures by volume for detonation. Table 3 provides a list of lower explosive limit (LEL) and higher explosive limit (HEL) values in percent of volume for fuel in a fuel-air mixture. A corresponding ignition temperature (IT) is provided for each set of detonability limits of fuels when mixed with air. The stoichiometric volume for a given fuel air mixture is in between the LEL and HEL. As indicated by the values in Table 3, the fuel volume is considerably less than that of air, permitting smaller or fewer fuel valves to be used in comparison to air valves.

TABLE 3

| Substance | LEL (%) | HEL (%) | IT (° C.) |
|---|---|---|---|
| Acetylene | 2.5 | 100 | 305 |
| Avgas 100 | 1.2 | 7 | 433 |
| Benzene | 1.2 | 7.8 | 498 |
| Butane | 1.9 | 8.5 | 287 |
| Diesel | 0.6 | 7.5 | |
| Ethane | 3 | 12.5 | 472 |
| Ethanol | 3.3 | 19 | 363 |
| Ethylene | 2.7 | 36 | 450 |
| Gasoline | 1.4 | 7.6 | |
| Heptane | 1.05 | 6.7 | 204 |
| Hexane | 1.1 | 7.5 | 225 |
| Hydrogen | 4 | 74 | 572 |
| JP-10 | | | 245 |
| JP-4 | 1.3 | 8 | 246 |
| JP-5 | 0.6 | 4.6 | 241 |
| JP-7 | 0.6 | 4.6 | 241 |
| JP-8 | 0.6 | 4.7 | 238 |
| Kerosene | 0.6 | 4.9 | |
| Methane | 5 | 15 | 537 |
| Octane | 1 | 6.5 | 206 |
| Pentane | 1.4 | 8 | 260 |
| Propane | 2.1 | 9.5 | 450 |

An internal detonation reciprocating engine in accordance with the present invention, requires a supply of air under pressure. An air supply to the engine may use a pump to deliver air under pressure. The pump may be driven by the crankshaft or a separate prime mover. The fuel also has to be delivered under pressure. In turn, a fuel pump may be directly driven by the crank shaft or a separate motor to supply the desired fuel.

The deflagration to detonation transition reciprocating engine may be designed to operate in a Four-Stroke mode or a Two-Stroke mode, in accordance with the present invention. In some embodiments, the internal detonation reciprocating engine may be designed to run with just one cylinder. The four stroke single cylinder internal detonation reciprocating engine will require a heavy flywheel to carry the energy from the power stroke to the three others. The two stroke version may also require a heavy flywheel.

Just as diesel two strokes are faster and not as polluting as two stroke gasoline engines, owing to their leakage of fuel-air mixtures, two stroke deflagration to detonation transition reciprocating engines, in accordance with the present invention can also be designed so that they do not pass unburnt fuel through to the exhaust.

Similar to the internal combustion reciprocating engines, the internal detonation reciprocating engine may also be designed in a four cylinder configuration, with each cylinder operating at a different stage. In accordance with the present invention, internal detonation reciprocating engine may be designed as a six cylinder engine in a horizontally opposed, V, or inline configuration. Larger cylinder engines may be designed in accordance with the present internal detonation reciprocating engine invention as desired or in accordance with power requirements. Scaling of the engine power output, in accordance with the present invention, can be met by altering one or many of the parameters discussed above and also by modifications which include the bore, main cylinder and piston diameter, and the stroke length.

A internal detonation reciprocating engine, in accordance with the present invention, may be started from stop and accelerated by increasing the frequency of operation. To start a single cylinder internal detonation reciprocating engine, a starter motor may be used to turn the crankshaft, causing the fuel-air mixture to be compressed before ignition.

A multi-cylinder internal detonation reciprocating engine may be started by forcing compressed air into one of the cylinders forcing the piston to the bottom dead center, thereby causing the cylinder at the power stroke to compress the fuel-air mixture in that cylinder before ignition. Once ignition occurs, the engine can start moving under its own power. In another embodiment, a multi-cylinder internal detonation reciprocating engine may be started up using a starter motor to turn the crankshaft.

The frequency of operation or the speed of the engine can be controlled using the valve and ignition timing. The detonation power stroke is the fastest, while the filling, exhaust and compression strokes take longer. Thus, the highest engine speed is a factor of the fastest possible filling time, exhaust time, compression time and detonation and blow down time.

During the power stroke of the internal detonation reciprocating engine, deflagration to detonation transition will give rise to a detonation wave, which moves at supersonic speeds, while the piston moves much slower at, for example, a few meters per second. Thus, the detonation wave will reflect off the piston and travel back into the cylinder. The reflection may occur again from the end wall of the engine head. The multiple reflections of the detonation wave will cause the detonation to decouple and weaken and to eventually die out. In turn, a much higher pressure and temperature is developed within the engine cavity. The piston and the connecting rods of and internal detonation reciprocating engine need to withstand high thermal and pressure shocks associated with detonations.

A relief valve, such as RV1 145 in FIG. 1, will open if an overly dangerous pressure remains in the engine cavity when the piston has reached bottom dead center. In the embodiment shown in FIG. 1, exhaust valve EV2 140 disposed towards the top dead center of the main cylinder may be opened if extremely high pressure develops while the piston 150 is still at top dead center or mid-way between the top and bottom. These relief valves may be electronically controlled and operated by a central control unit.

Figure 3A:
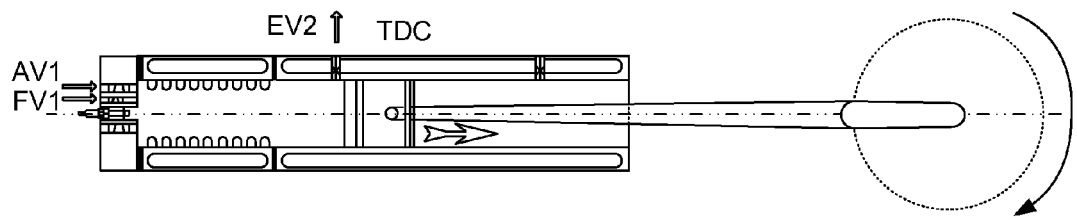
FIGS. 3A-3F show an exemplary four stroke cycle for an internal detonation reciprocating cylinder in accordance with the present invention.
Figure 3B:
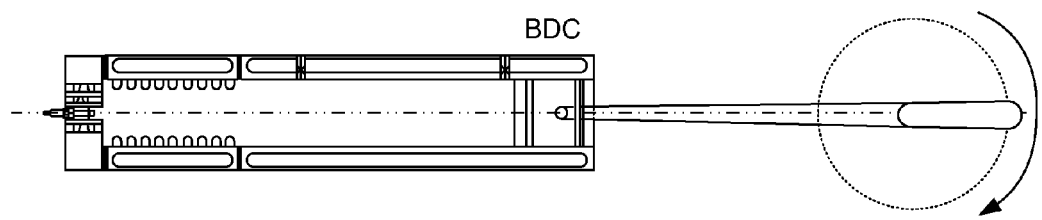

A four stroke exemplary operation of an internal detonation reciprocating engine, in accordance with the present invention is shown in FIGS. 3A-3F. FIG. 3A shows the start of a purge and charge stroke. After the exhaust stage, of a previous cycle, there will may still be burnt gases in the dead volume in the engine cavity. When the purge and charging stage starts, the piston 150 will be at top dead center (TDC), and the exhaust valve EV1 will close, but EV2 on the side of the main cylinder 190 will remain open. The air valve AV1 opens and pumps in air at high pressure. This forces the remaining burnt gases out of EV2, and pushes the piston 150 down towards bottom dead center (BDC), as shown in FIG. 3B. Exhaust valve EV2 is closed after the piston 150 has reached midway. Then, a fuel valve FV1 will open and inject pressurized fuel. The descending piston 150 creates a suction that will aid in the mixing of the fuel with the air. Just enough fuel may be injected to reach the required equivalence ratio.

Figure 3C:
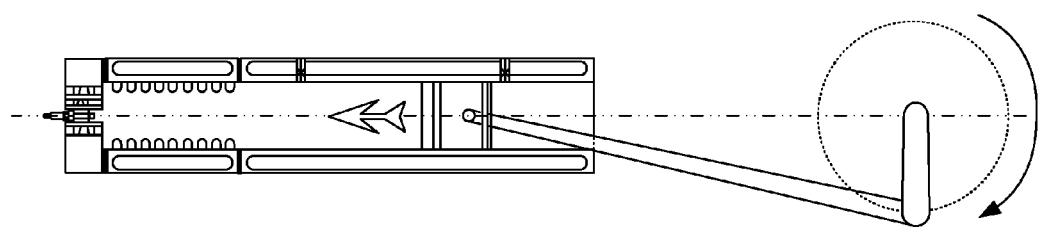
Figure 3D:
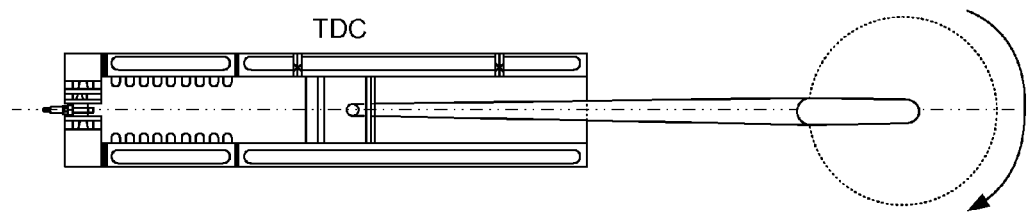

When the piston 150 has reached BDC, as shown in FIG. 3B, the compression stroke will start, with all the valves shut. The piston moves towards the TDC compressing the fuel-air mixture within, wherein the piston 150 moving toward TDC in the compression stroke is shown in FIG. 3C. This pressurization also helps in the fuel-air mixing. The piston reaches TDC, at which point the fuel-air mixture within the dead volume is at high pressure and a moderately high temperature, as shown in FIG. 3D.

Figure 3E:
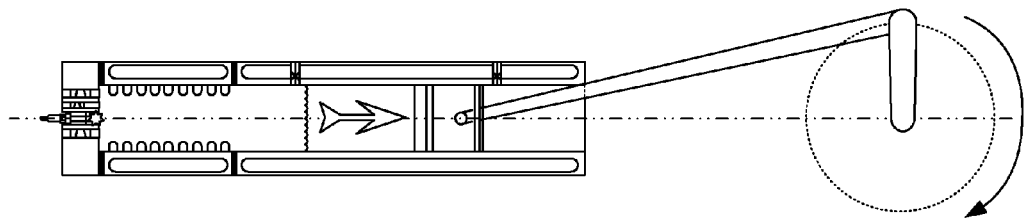

When the piston has reached TDC, a spark will be fired. This will cause a deflagration to initiate, followed by deflagration to detonation transition giving rise to a detonation wave. A detonation wave will pass through the fluid, producing a rapid release of energy and giving rise to high pressures and temperatures. This will push the piston 150 down towards BDC, as shown in FIG. 3E.

The detonation wave, traveling at supersonic speeds in the unburnt gases, will reach the piston as it is descending. It will then reflect off the piston and travel back into the cylinder towards the engine head wall. The detonation wave will then reflect from the back wall and this reflection process may be repeated until all the fuel has been burnt up and the detonation wave weakens and dies out. Thus, the pressure rise within the engine cavity will be tremendously higher than a regular deflagration process.

When the piston reaches BDC, the exhaust valves EV1 140 and EV2 140 opens up, causing the high pressure gases to vent. If the pressure build up is much higher than what is required, the relief valve RV1 145 may be opened to relieve the pressure during the power stroke. The spark timing may be retarded if required, so that the ignition occurs as the piston is retreating.

Figure 3F:
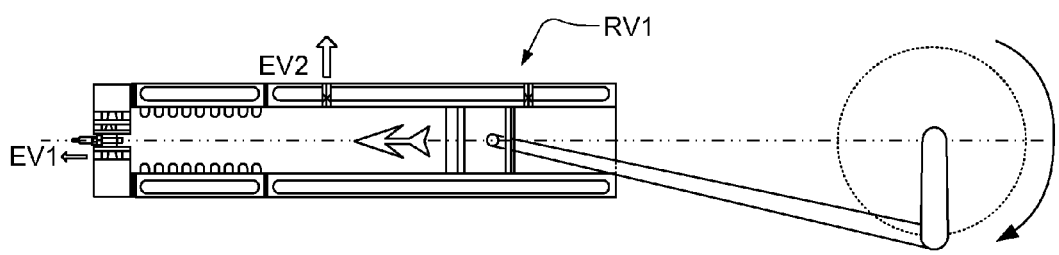

The piston will then start back up from BDC towards TDC, with exhaust valves EV1 140 and EV2 140 open, during an exhaust stroke, as shown in FIG. 3F. The hot exhaust will be expelled and may be used to drive a turbine or for other combined cycle power conversion process.

When the piston reaches TDC, there will still be burnt gases in the dead volume in the engine cavity. This will be expelled by the fresh air charge during the next purge and charge stroke.

Figure 4A:
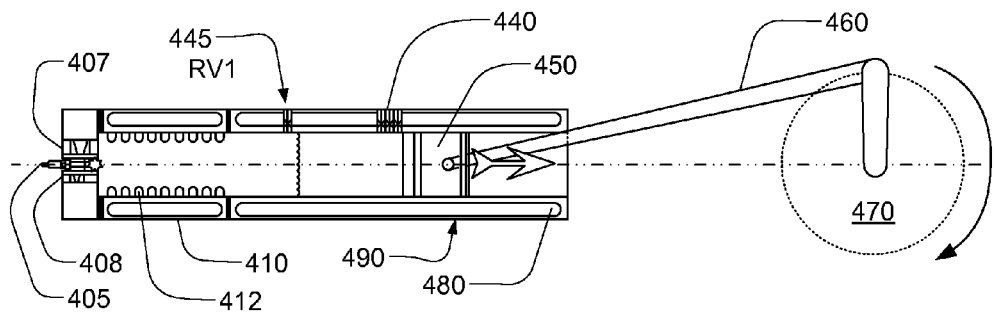
FIGS. 4A-4F illustrate an exemplary two stroke cycle for an internal detonation reciprocating cylinder in accordance with the present invention.

A four-stroke internal detonation reciprocating engine, in accordance with the present invention, will produce power only once every two rotations of the crankshaft. In contrast, a two-stroke internal detonation reciprocating engine will make use of the rapidity of the detonation process. Because the detonation wave travels at supersonic speeds in the unburnt fuel-air mixture, the combustion will be complete within a few microseconds in an engine cavity that may be up to a meter or more in length. Thus, the power stroke and the purging and charging stroke can be unified into one movement of the piston from TDC to BDC. However, higher pressures will be required for the charging of the air and fuel, as compared to the four-stroke cycle. Therefore, stronger air and fuel pumps may be needed. In addition, the fuel and air valves may be larger or greater in number as compared with the valves in a four stroke embodiment. The geometry of the two-stroke internal detonation reciprocating engine is similar to that of a four-stroke internal detonation reciprocating engine, but the placements of the valves are different, as seen in FIG. 4A. A relief valve RV1 445 is also present on the main cylinder 490 for safety, FIG. 4A.

Figure 4B:
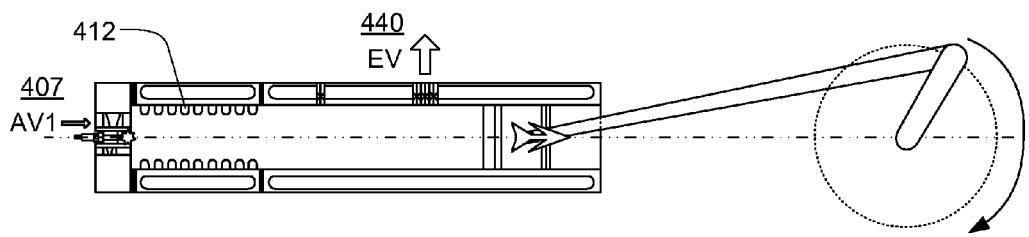
Figure 4C:
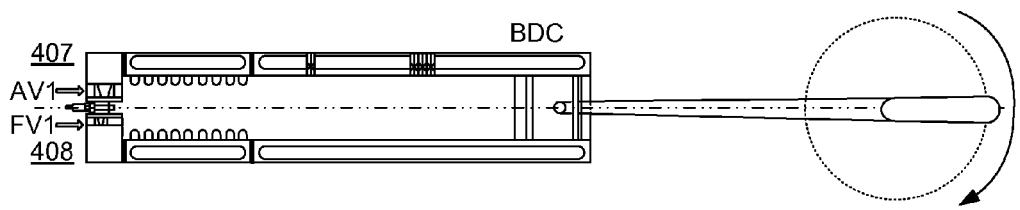

FIGS. 4F and 4A-4C illustrate an exemplary power, purge, and charge stroke in accordance with an embodiment of the present invention. The elements of the main cylinder 490 are parallel to those shown and described in relation to FIGS. 1 and 3A-3F. The piston 450 will start at top dead center TDC, FIG. 4F, with the ignition spark giving rise to a detonation wave. The high pressure generated will drive the piston 450 down toward BDC, as shown in FIGS. 4A and 4B. As the piston passes a midway point, the exhaust valve EV 440 is opened, causing the hot exhaust to be vented, while the piston continues to BDC, as shown in FIG. 4B. Air valve AV1 407 will also be opened at this point, allowing pressurized air to be injected into the engine cavity, driving the hot exhaust out, also shown in FIG. 4B. Once all the exhaust gases have been evacuated, the fuel valve FV1 408 may be opened to allow the injection of pressurized fuel into the air contained within the engine cavity. When the piston has reached BDC, FIG. 4C, the next stroke is set to begin.

Figure 4D:
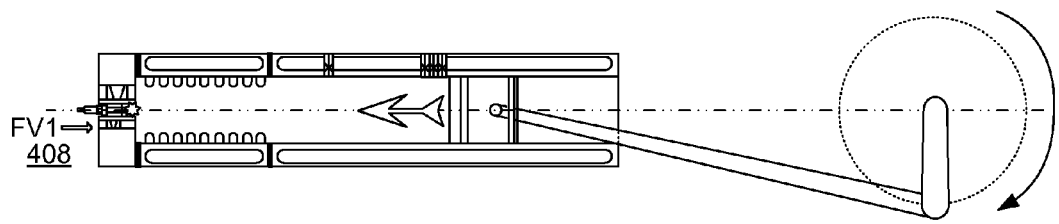
Figure 4E:
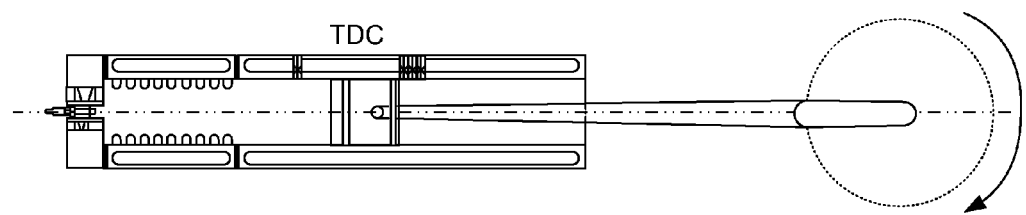
Figure 4F:
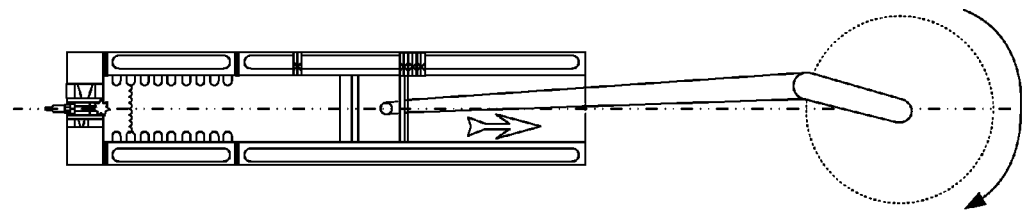

The charge and compression stroke is shown, beginning from FIG. 4D. From BDC, the piston 450 starts its upward motion towards TDC. The fuel valve 408 which was opened during the previous stroke may continue to remain open for a set period until the required equivalence ratio has been reached. The piston 450 will compress the fuel-air mixture, which will also aid in the mixing of the fuel with the air. Once the piston reaches TDC, FIG. 4 E, the spark is discharged and the next cycle begins.

The two-stroke internal detonation reciprocating engine has one power stroke in every rotation of the crankshaft 470 and thus may produce twice as much power as a four-stroke internal detonation reciprocating engine. The two-stroke internal detonation reciprocating engine also may be configured with multiple cylinders, in an in-line, a V, or a horizontally opposing configuration.

Figure 5C:
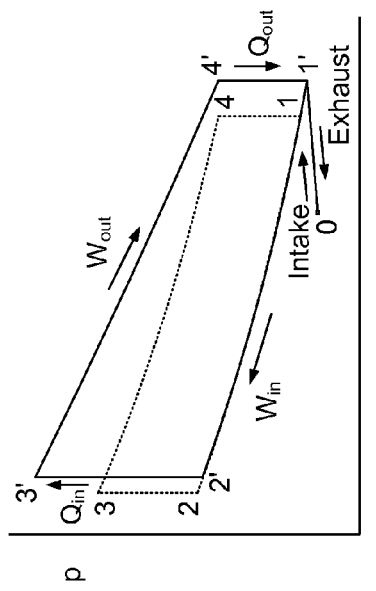
FIGS. 5A-5D show the power cycle of a conventional internal combustion engine and an internal detonation reciprocating engine.
Figure 5D:
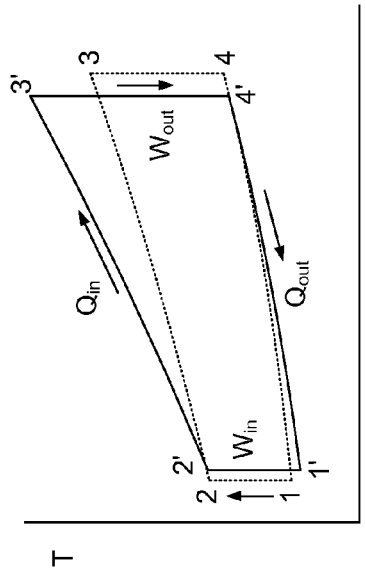
Figure 5A:
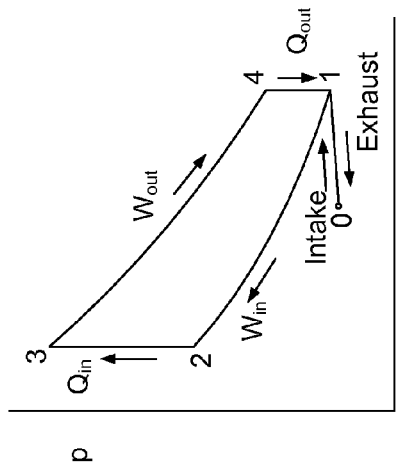
Figure 5B:
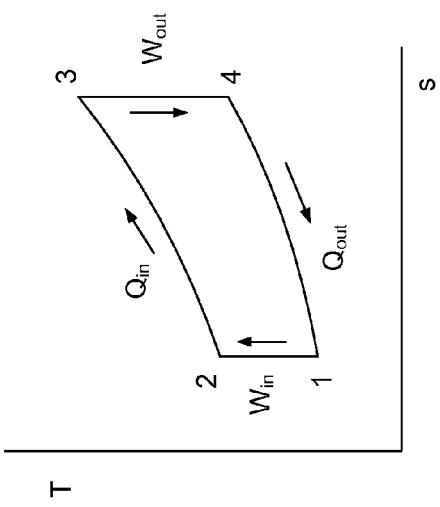

FIGS. 5A and 5B show Otto Cycles, pressure as a function of volume curve and a temperature as a function of entropy, respectively, for a conventional internal combustion engine cycle. FIGS. 5C and 5D show the power curves of a conventional internal combustion engine overlaid with respective curves for a reciprocating detonation engine cycle.

An Otto Cycle engine has a power cycle consisting of adiabatic compression, heat addition at constant volume, adiabatic expansion, and rejection of heat at constant volume and is characterized by four strokes, as described above. These four processes are represented by segments 1 to 2, 2 to 3, 3 to 4, and 4 to 1, respectively. The four strokes of the piston are described in relation to the Otto Cycle below. The points of an internal detonation reciprocating engine cycle are shown by 1', 2', 3', and 4' in FIGS. 5C and 5D. The pressure-volume and temperature-entropy curves have similar trends compared to an Otto Cycle. However, the pressures and temperatures on the internal detonation reciprocating engine cycle are significantly higher, indicating that the work and heat outputs are higher.

The area enclosed by the pressure-volume diagram denotes the work done by the engine cycle on a unit mass of gas and the area enclosed by the temperature-entropy diagram denotes the heat output of the engine cycle from a unit mass of gas. Thus, it is clear that the internal detonation reciprocating engine cycle can yield higher work and heat outputs than a conventional Otto Cycle.

In the Otto cycle pressure-volume and temperature-entropy diagrams, the segment 1-2 denotes the isentropic compression of the air as the piston moves from bottom dead center to the top dead center. There is a small increase in temperature. Segment 2-3 shows the constant volume heat addition when the combustion of the fuel-air mixture occurs following the spark with the piston at the top dead center. A drastic increase in temperature is now seen in the temperature-entropy diagram at the end of segment 2-3. Segment 3-4 is an isentropic expansion of the burnt gas as the high pressure and temperature drives the piston downward to the bottom dead center position. This is the power stroke. Segment 4-1 is the constant volume heat removal process which occurs when the piston is at the bottom dead center. Segment 1-0 denotes the exhaust stage when the burnt gas is expelled from the engine.

In the internal detonation reciprocating engine cycle, segment 1'-2' is the compression stroke, with the piston moving from bottom dead center to top dead center. Segment 1'-2' results in higher compression ratio than the Otto cycle due to the longer stroke, but there is a larger dead volume in the internal detonation reciprocating engine, which will be highly compressed and hot at the end of this process. The ignition is initiated during segment 2'-3' and a deflagration to detonation transition occurs. The piston will be at the top dead center or has started to move downward. Delay in ignition may be controlled by the digital central control unit. The detonation creates a high pressure which drives the piston down towards the bottom dead center. This process is denoted as the isentropic expansion process denoted by 3'-4'. Expansion waves will travel upstream into the cylinder towards the end wall. Segment 4'-1' is a constant volume heat rejection process with the hot gas being cooled following the expansion brought about by the piston moving downward to bottom dead center. Segment 1'-O is the exhaust and purge process where cold air is pumped into the engine cavity to remove the burnt gases. The piston moves back up towards top dead center. Segment 0-1' is the charging process, when fresh air is pumped into the engine cavity and fuel is injected into the air, as the piston moves back towards bottom dead center.

In the two stroke internal detonation reciprocating engine cycle, the piston does not move all the way to top dead center during segment 1'-0 and vice versa during 0-1'.

Detonation mode reciprocating engines can use a variety of fuels, including liquid fuels such as low octane gasoline, kerosene, jet fuels and diesel, as well as gaseous fuels such as natural gas, propane, methane, hydrogen, and other fuels. A good detonation fuel is hydrogen, as such, internal donation reciprocating engines may be good candidates for future fuel systems. Detonations also produce a more thorough combustion of the fuel, thereby may yield reduced emissions of carbon monoxide as compared to internal combustion engines. An internal detonation reciprocating engine may find potential application for transportation: in automobiles; locomotives; large trucks; and earth moving vehicles; ships; and boats. Internal detonation reciprocating engines may also be used for power generators, which today use internal combustion reciprocating engines, powered by gasoline, kerosene and diesel. Internal deflagration to detonation transition reciprocating engines produce tremendous amounts of heat, all of which may not be directly useful to drive the piston. The heat from the cooling water may be used to boil water or in an alternate heat exchange capacity. The exhaust gases may be used for co-generation or in a combined heat and power system.

While specific alternatives to steps of the invention have been described herein, additional alternatives not specifically disclosed but known in the art are intended to fall within the scope of the invention. Thus, it is understood that other applications of the present invention will be apparent to those skilled in the art upon reading the described embodiment and after consideration of the appended claims and drawing.

What is claimed is:

1. An internal detonation reciprocating engine, the engine comprising:
   an engine head, which houses at least a spark plug, an intake valve, and an exhaust valve and which attaches to a deflagration to detonation chamber;
   the deflagration to detonation chamber, which is attached the engine head on one end and to a main cylinder on another end, and which comprises a turbulence inducing structure;
   the main cylinder;
   a piston housed in the main cylinder;
   a connecting rod, which is connected to the piston at a first end;
   a crank shaft, which is connected to the connecting rod on a second end; and
   an intake system, an exhaust system, and a relief system, which are disposed in any of the engine head, the deflagration to detonation chamber, and the main cylinder.

2. The engine according to claim 1, wherein:
   the intake system comprises a fuel intake valve and an air intake valve and is disposed in the engine head, and wherein the intake system supplies air and fuel; and
   the exhaust system comprises an exhaust valve, which is disposed in the engine head and which exhausts burnt gases.

3. The engine according to claim 1, wherein:
   the exhaust system comprises a first valve disposed in the engine head and a second valve disposed in the main cylinder.

4. The engine according to claim 1, wherein:
   the relief system comprises at least one relief valve disposed in the main cylinder, which provides relief if high pressure builds up in the main cylinder at an undesired stage in an engine cycle.

5. The engine according to claim 1, wherein:
   the spark plug is recessed in the engine head, which reduces the spark plugs exposure to direct shock waves.

6. The engine according to claim 1, further comprising:
   spiral ridges grooved into an internal wall of the deflagration to detonation section, wherein:
      the section is cylindrical;
      the base of the grooves and the internal wall of the deflagration to detonation section wall form a first diameter; and
      the height of the grooves form a second diameter; and
      a blockage ratio, which is a function of the first and second diameters, is greater than 40 percent.

7. The engine according to claim 6, wherein
   a pitch of the spiral ridges is greater than or equal to a cell size for the fuel-air mixture being used.

8. A method of rotating a crank shaft, the method comprising:
   injecting a fuel air mixture into a detonation to deflagration section;
   compressing the injected fuel air mixture;
   igniting the compressed fuel air mixture inducing a deflagration wave;
   inducing a detonation wave from the deflagration wave;
   passing the detonation wave through a fluid, giving rise to high pressure and temperature in a cylinder and pushing a piston towards bottom dead center;
   transferring the downward motion of the piston to rotational motion about a crankshaft using a connecting rod, wherein rotating the crankshaft is a four stroke cycle;
   after an exhaust stroke, opening an air valve and injecting compressed air through an engine head, forcing remaining burnt gases out of a dead volume in a cylinder cavity;
   after injection of compressed air, opening a fuel valve and injecting pressurized fuel, wherein a piston descends to a bottom of a cylinder forming an intake stroke;
   closing exhaust and intake valves and moving the piston towards a top of the cylinder, compressing the injected fuel and air forming a compression stroke;
   firing a spark into the engine head and initiating deflagration;
   converting a deflagration wave into a detonation wave via a turbulence inducing structure, pushing the piston towards a bottom of the cylinder creating a power stroke;
   opening exhaust valves, venting high pressure gases;
   moving the piston towards the top of the cylinder forming an exhaust stroke; and
   opening a relief valve in the cylinder disposed towards the bottom of cylinder during the power stroke.

9. The method according to claim 8, wherein:
   opening exhaust valves comprises opening a first exhaust valve in the engine head; and a second exhaust valve in the cylinder, disposed towards the top of the cylinder.

10. The method according to claim 9, further comprising:
    opening the second exhaust valve disposed towards the top of the cylinder during the compression stroke to relieve pressure in the cylinder.

11. The method according to claim 8, further comprising:
    controlling valve opening and closing electrically.

12. The method according to claim 8, further comprising:
    controlling valve opening and closing mechanically.

13. The method of claim 8, wherein:
    rotating a crankshaft is a two stroke cycle.

14. A single cylinder four stroke internal detonation reciprocating engine, the engine comprising:
    an engine head, which houses at least a spark plug, an intake valve, and an exhaust valve and which attaches to a deflagration to detonation chamber;
    the deflagration to detonation chamber, which is attached the engine head on one end and to a main cylinder on another end, and which comprises a turbulence inducing structure;
    the main cylinder;
    a piston housed in the main cylinder;
    a connecting rod, which is connected to the piston at a first end;
    a crank shaft, which is connected to the connecting rod on a second end; and
    a flywheel positioned on the crankshaft to carry energy from a power stroke to three of the four remaining strokes; and
    an intake system, an exhaust system, and a relief system, which are disposed in any of the engine head, the deflagration to detonation chamber, and the main cylinder.

15. The engine of claim 14, further comprising:
a starter motor to start to move the crankshaft and raise the piston, compressing a fuel-air mixture at the onset of engine operation.

16. A single cylinder two stroke internal detonation reciprocating engine, the engine comprising:
- an engine head, which houses at least a spark plug, an intake valve, and an exhaust valve and which attaches to a deflagration to detonation chamber;
- the deflagration to detonation chamber, which is attached the engine head on one end and to a main cylinder on another end, and which comprises a turbulence inducing structure;
- the main cylinder;
- a piston housed in the main cylinder;
- an exhaust valve midway between a top dead center and a bottom dead center;
- a connecting rod, which is connected to the piston at a first end;
- a crank shaft, which is connected to the connecting rod on a second end; and
  - a flywheel positioned on the crankshaft to carry energy from a power stroke to a remaining strokes.

* * * * *